United States Patent
Ramakrishnan et al.

(10) Patent No.: US 9,229,898 B2
(45) Date of Patent: Jan. 5, 2016

(54) CAUSATION ISOLATION USING A CONFIGURATION ITEM METRIC IDENTIFIED BASED ON EVENT CLASSIFICATION

(75) Inventors: Krishna Mahadevan Ramakrishnan, Tamilnadu (IN); Harvadan Nitin Nagoria, Surat Gujarat (IN); Amit Kumar, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 663 days.

(21) Appl. No.: 13/561,592

(22) Filed: Jul. 30, 2012

(65) Prior Publication Data

US 2014/0032159 A1    Jan. 30, 2014

(51) Int. Cl.
  *G06F 15/00* (2006.01)
  *G06F 11/34* (2006.01)

(52) U.S. Cl.
  CPC ............... *G06F 15/00* (2013.01); *G06F 11/34* (2013.01); *G06F 11/3409* (2013.01); *G06F 11/3466* (2013.01); *G06F 2201/81* (2013.01); *G06F 2201/86* (2013.01)

(58) Field of Classification Search
  CPC . G06F 11/34; G06F 11/3409; G06F 11/3466; G06F 15/00; G06F 2201/81; G06F 2201/86
  USPC ............... 702/127; 706/12, 20; 707/600, 722; 709/224; 705/7.31
  See application file for complete search history.

(56) References Cited

U.S. PATENT DOCUMENTS

| | | | |
|---|---|---|---|
| 7,693,805 B2 * | 4/2010 | Koran | 706/20 |
| 7,707,015 B2 | 4/2010 | Lubrecht et al. | |
| 7,949,628 B1 | 5/2011 | Blazek et al. | |
| 2006/0161444 A1 | 7/2006 | Lubrecht et al. | |
| 2010/0125664 A1 | 5/2010 | Hadar et al. | |
| 2010/0192228 A1 | 7/2010 | Levi | |
| 2011/0012902 A1 | 1/2011 | Rajagopalan et al. | |
| 2012/0246303 A1 * | 9/2012 | Petersen et al. | 709/224 |

* cited by examiner

*Primary Examiner* — John H Le
(74) *Attorney, Agent, or Firm* — Rathe Lindenbaum LLP

(57) ABSTRACT

Based on an event classification for an event of a cross-domain computing environment, a metric of a configuration item is obtained and used to isolate a causation of the event, wherein the event is a symptom or occurrence of an operational problem of at least one computing device in the cross-domain computing environment.

19 Claims, 3 Drawing Sheets

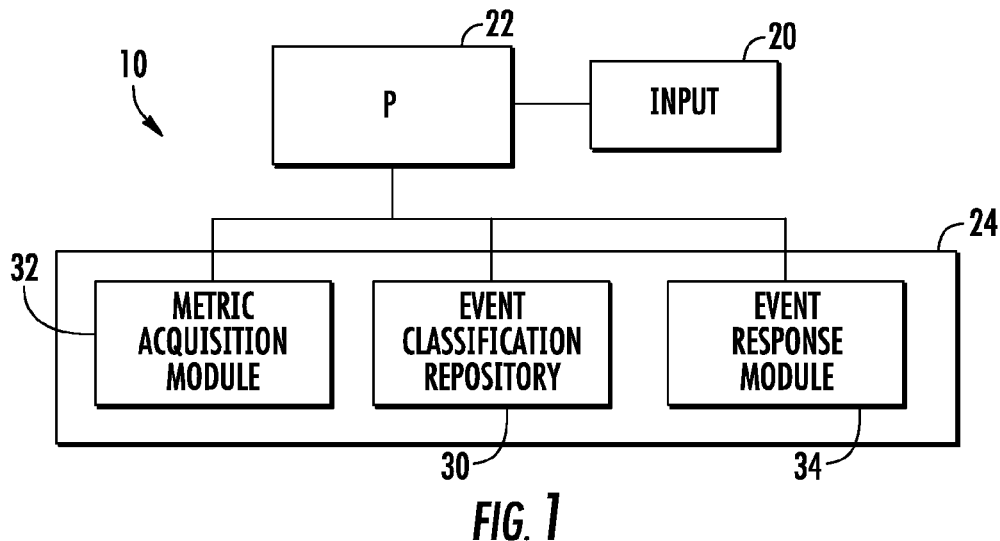
FIG. 1
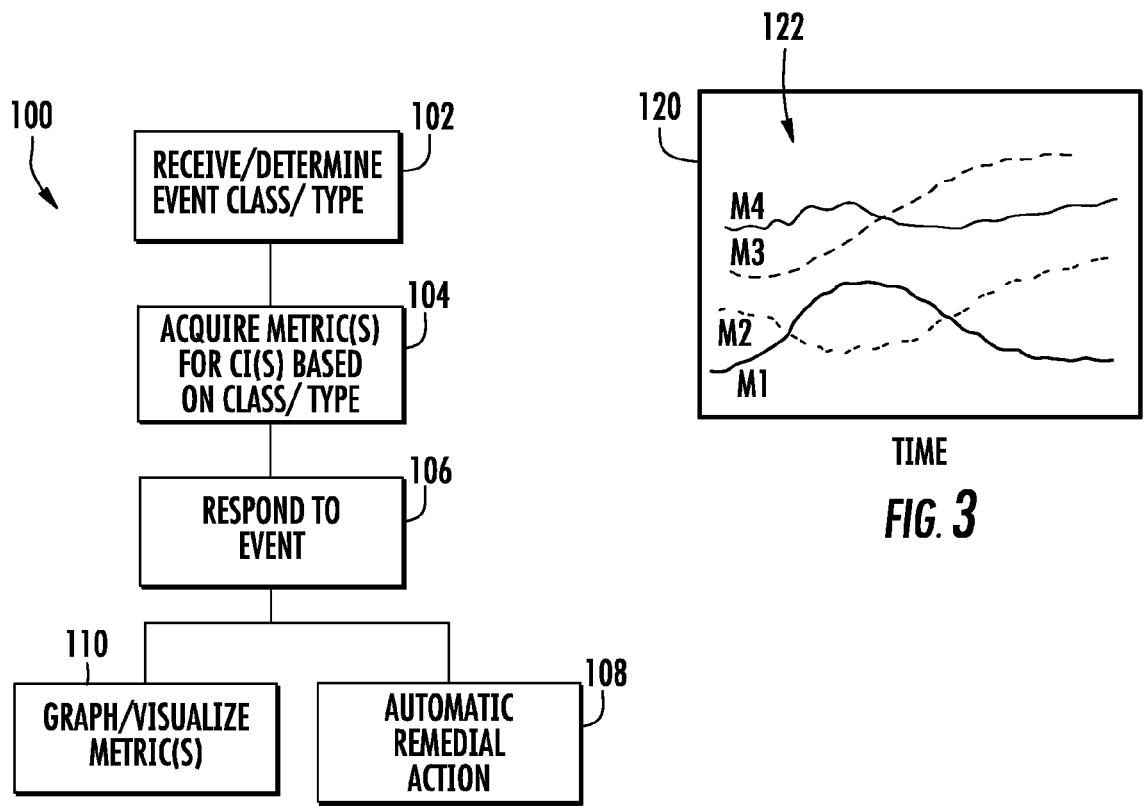
FIG. 2
FIG. 3

CAUSATION ISOLATION USING A CONFIGURATION ITEM METRIC IDENTIFIED BASED ON EVENT CLASSIFICATION

BACKGROUND

Cross-domain computing environments may involve multiple configuration items belonging to different domains. As a result, identifying the root causes of an event to resolve the event may be extremely complex and difficult.

BRIEF DESCRIPTION OF THE DRAWINGS

FIG. 1 is a schematic illustration of an example configuration management system.

FIG. 2 is a flow diagram of an example method that may be carried out by the configuration management system of FIG. 1.

FIG. 3 is a diagram illustrating an example display with an example of metric graphing that may be carried out by the system of FIG. 1.

DETAILED DESCRIPTION OF THE EXAMPLE EMBODIMENTS

Figure 4:
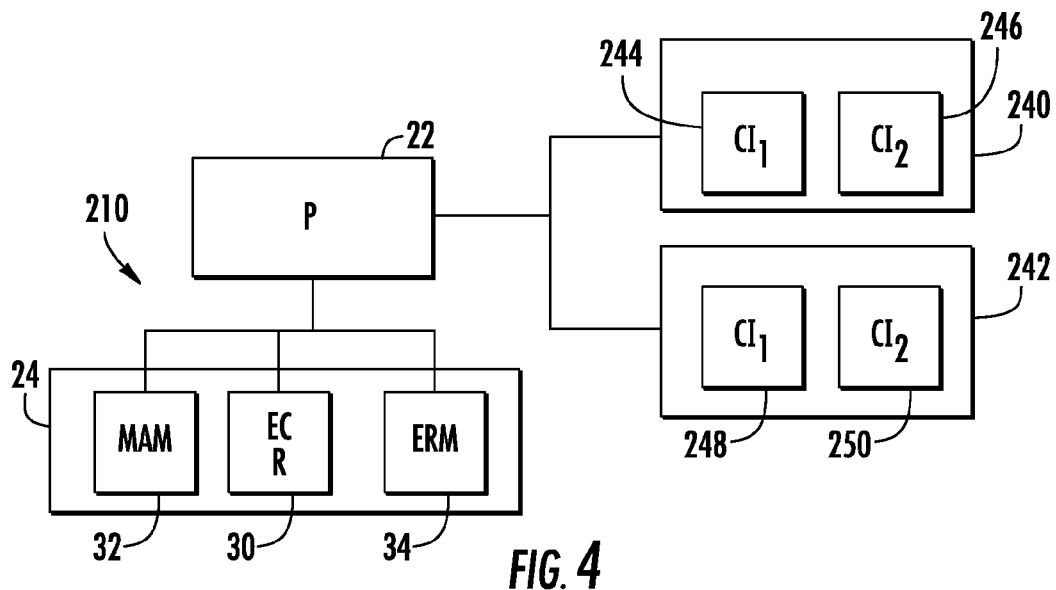
FIG. 4 is a schematic illustration of another example configuration management system.

FIG. 1 schematically illustrates an example configuration management system 10. As will be described hereafter, configuration management system 10 facilitates reactive management of information technology (IT) infrastructure using event based operations. In particular, configuration management system 10 utilizes a classification or type designation for an event in a cross-domain computing environment to identify configuration items and or metrics to isolate the one or more causes or causation for the event. As a result, configuration management system 10 better facilitates the identification of root causes for an event such that the problem or event may be remedied.

Configuration management system 10 comprises input 20, processing unit 22 and memory 24 which comprises event classification repository 30, metric acquisition module 32 and event response module 34. Input 20 comprises an input device by which processor 22 receives an event classification or type. In one implementation, input 20 may comprise a user input device by which a person inputs a known or determined type or classification for a problem or event. For example, input 20 may comprise a keyboard, keypad, touch pad, a microphone and associated speech recognition software, and the like. In another implementation, input 20 may comprise an input device by which processor receives an indication of the occurrence of an event or characteristics of an event. For example, input 20 may comprise a port connected to one or more monitoring devices or sensors that sense or monitor configuration items across multiple domain computing environments. In such an implementation, processor 22 may utilize information regarding the event to determine a classification or type for the event.

Processor 22 comprises one or more processing units follow instructions contained in at least modules 32 and 34 to acquire one or more metrics for one or more configuration items based upon the event classification or type and to further respond to the event at least in part by facilitating the isolation of a root cause (configuration item user setting) for the event. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, processor 22 may be embodied as part of one or more application-specific integrated circuits (ASICs). Unless otherwise specifically noted, the controller is not limited to any specific combination of hardware circuitry and software, nor to any particular source for the instructions executed by the processing unit.

Memory 24 comprises one or more non-transient computer-readable mediums and one or more locations which contain computer-readable programming or code for directing the operation of configuration management system 10. Memory 24 further serves as a database for storing relevant information (such as runtime values or information, system topologies, and configurations or settings) of components (configuration items, CIs) of the cross-domain configuration management database environment managed by configuration system 10. Memory 24 comprises event classification repository 30, metric acquisition module 32 and event response module 34.

Event classification repository 30 comprises one or more tables of cross-domain data for analysis and identification of root causes to facilitate broader insight into an event or problem. Event classification repository 30 facilitates analysis of metrics of neighboring configuration items, facilitating identification of possible issues in such neighboring configuration items that may have contributed to the root cause without waiting for corresponding events. Event classification repository 30 comprises a database or repository of mapping between event classifications, configuration items and metrics for the configuration items. For example, for a particular event classification or type, event classification repository 30 may link, map or associate the particular event type to one or more configuration items CIs. For each of the CIs mapped to the particular event type, repository 30 may further identify one or more particular metrics for the CIs depending upon the event classification or type. Repository 30 serves as a database for narrowing down the number of configuration items as well as the number of metrics for the configuration items that are most relevant or that should be evaluated in response to the occurrence of an event of a certain classification or type. The construction of repository 30, the linking of particular event types are classifications with particular configuration items in particular configuration item metrics is generated based upon previously collected performance metrics for configuration items during previously occurring events. In one implementation, repository 30 and its model mapping of event types to configuration items and ticker metrics may be manually created, updated or manually maintained as events take place and data is collected. In another implementation, repository 30 and its model mapping may be automatically generated and maintained by processing unit 22 as data is collected and events occur. In other words, processor 22 may automatically identify the relationship and relevance of particular performance metrics of particular configuration items to particular event classifications or types.

For purposes of this disclosure, an event type or classification is a predetermined classification or grouping of events having one or more commonalities with one another. An event is a symptom or occurrence related to a problem or desired outcome for which a change in a configuration item may be beneficial. An event type may be classified based upon one or more factors are characteristics or one or more thresholds. For example, CPU load may comprise a single event type or classification or may comprise multiple different event types or classifications, wherein each different CPU load classification has different thresholds or ranges. A first CPU load event classification may encompass events with a CPU load of between A and B while a second CPU load event classification may encompass events with a CPU load of between C and D, wherein the variables A, B, C and D are different CPU load thresholds. The different CPU load event classifications may be mapped to different configuration items in different metrics for the configuration items. Other examples of event classifications include, but are not limited to, CPU run queue (indicating if too many processes are getting queued demanding CPU resources) hard disk utilization (indicating the utilization of a hard disk), FTP service (the status of FTP service, CPU usage by structured query language (SQL), SQL query performance (the elapsed time of an SQL query), database server status (the particular status of a database server), web server response time (response time for a Web server), active directory service access status and virtualization service status (status of the virtualization service running on the server). The number of event classes or types as well as the characteristics of such event classes or types may vary.

For purposes of this disclosure, a configuration item or CI means a structural unit of a topological map of configuration management system 10, examples of which may include, but are not limited to, firmware such as the operating system that runs the remote terminal unit, configuration such as the data file that control the operation of a terminal unit or logic such as the application software that performs direct digital control functions. Such firmware, configuration and logic CIs constitute primitive level configuration items as they cannot be further decomposed and may be managed as self-contained units. For purposes of this disclosure, configuration items may also comprise aggregates of such primitive level configuration items. For example, a terminal unit may be an aggregate configuration item comprising a combination or aggregation of primitive configuration items firmware, configuration and logic.

Specific examples of configuration items include, but are not limited to, a UNIX system, a WINDOW system, and Oracle database, a UNIX system, window system, Oracle database, Microsoft structured query (MS SQL) language database, Internet Information Services (IIS) Web server, Apache Web server, MS-Exchange server, CPU, disk, router, and switches. The number of configuration items as well as the characteristics of such configuration items may vary.

Modules 32 and 34 comprise computer-readable programming or code modules stored in memory 24 that directs processor 22 in carrying out the example method 100 illustrated in FIG. 2. As indicated by step 102, metric acquisition module 32 to receive/determine an event classification for an event of a cross-domain computing environment. As noted above, in one implementation, event classification may be input by a person or may be received from an external computing device. In another implementation, module 32 may direct processor 22 to receive information regarding an event occurrence and to determine to which event classification of repository 30 the event belongs.

As indicated by step 104 in FIG. 2, metric acquisition module 32 further directs processor 22 to acquire one or more metrics for the one or more configuration items that are selected based upon the event class or type. In particular, metric acquisition module 32 instructs processor 22 to consult the one or more tables of repository 30. Using such tables and repository 30, processor 22 identifies those metrics for such configuration items that are associated or mapped to the particular event type for the received/determined event classification. In some implementations, a particular event may belong to several event types or event classifications. In such circumstances, metric acquisition module 32 acquires all of the CI metrics mapped to be several event groupings or classifications.

As indicated by step 106, event response module 34 directs processor 22 to respond to the event using the one or more CI metrics obtained from repository 30 by module 32 for the particular event class. In particular, module 34 obtains values for the identified CI metrics from a configuration management database (CMDB) which receives and stores such attributes from the CMDB network or multi-domain computing environment. Using such values for the identified CI metrics, processor 32 under the direction of module 34, responds to the event.

As indicated by step 108, in one implementation, event response module 34 directs processor 32 to analyze the values for the CI metrics and based upon such analysis (following a control algorithm or runbook automation tool) and to automatically take remedial action. For example, based upon analysis of the values for the identified metrics, processor 32 may perform troubleshooting and alter one or more configuration items or repair such configuration items. For example, processor 32 may generate control signals altering settings for one or more configuration items.

As indicated by step 110, event response module 34 may alternatively comprise a graphing module that directs processor 22 to provide a visual representation or graph of values for the identified CI metrics, allowing a person to visually analyze and isolate the one or more CIs that may be the cause for the event or the problem. FIG. 3 illustrates an example display 120 that may be in communication with processor 22. FIG. 3 illustrates an example graph 122 visually depicting values for four CI metrics over a time period related to the event. For example, in one implementation, graph 122 may visually depict values for the four CI metrics over a time period during which the event occurred. In other implementations, graph 122 may visually depict values for the four CI metrics immediately preceding or immediately following the event in time. In one implementation, each of the displayed metrics may be for a single CI. In another implementation, a portion of the display metrics may be for a first CI while another portion of the displayed metrics may be for a second CI. In one implementation, some of the displayed or graphed CI metrics may be from a first domain while another portion of the concurrently presented and graphed CI metrics may be from a second domain. The graphing of such CI metrics facilitates causation isolation for the problem or event.

In one implementation, system 10 may be configured to prompt a person to select the particular response to the event, either through graphing in step 110 or automatic remedial action in step 108. In one implementation, module 34 may cause processor 22 to provide one or more graphs of the CI metrics per step 110 while also providing a suggested remedial action for the event (determined from a control algorithm or run book), wherein prior to entering a command for carrying out the suggested media action, the person is presented with the one or more graphs to visually understand and confirm the recommended remedial action. In other implementations, system 10 may provide one of steps 108 or 110 to respond to an event per step 106.

FIG. 4 schematically illustrates configuration management system 210, an example implementation of system 10. Like system 10, configuration management system 210 utilizes a classification or type designation for an event in a cross-domain computing environment to identify configuration items and or metrics to isolate the one or more causes for the event. As a result, configuration management system 210 better facilitates the identification of root causes for an event such that the problem or event may be remedied. Configuration management system 210 is similar to system 10 except that system 210 is specifically depicted as being communication with a plurality of domains comprising domains 240 and 242. Those remaining elements of system 210 which correspond to elements of system 10 are numbered similarly.

Domains 240 and 242 each include a plurality of configuration items which are monitored and managed by system 210 and its configuration management database. Each domain 240, 242 is in communication with processor 22. In the example illustrated, domain 240 comprises CIs 244, 246 while domain 242 comprises CIs 248, 250.

Figure 5:
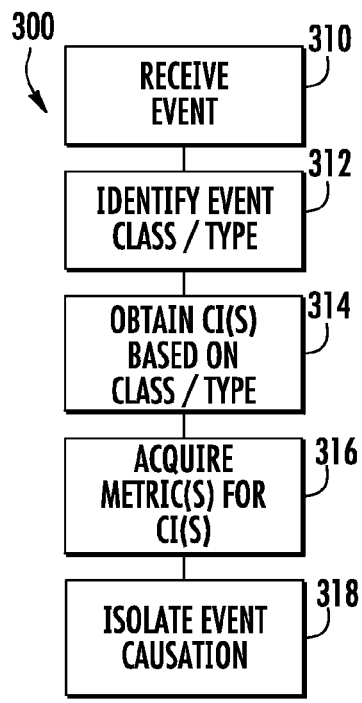
FIG. 5 is a flow diagram of an example method that may be carried out by the configuration management system of FIG. 4.

Modules 32 and 34 direct processor 22 to carry out the example method 300 illustrated in FIG. 5. As indicated by step 310, processor 22 receives an event occurring in the CMDB multi-domain environment. In particular, processor 22 receives sensed or monitored values indicating the occurrence of a problem/event. As indicated by step 312, metric acquisition module 32 instructs processor 22 to analyze the values associated with the event and to consult repository 30 to identify the one or more event categories or classifications to which the event belongs.

As indicated by steps 314 and 316, once processor 22 has determined the event class or event type to which the event belongs, module 32 further directs processor 22 to obtain the one or more CIs as well as the one or more metrics for the CIs based upon the identified event class/type. In particular, metric acquisition module 32 instructs processor 22 to consult the one or more tables of repository 30. Using such tables in repository 30, processor 22 identifies those metrics for such configuration items that are associated or mapped to the particular event type for receive/determined event classification. In some implementations, a particular event may belong to several event types or event classifications. In such circumstances, metric acquisition module 32 acquires all of the CI metrics map to be several event groupings or classifications.

As indicated by step 318, event response module 34 directs processor 22 to respond to the event using the one or more CI metrics obtained from repository 30 by module 32 for the particular event class. In particular, module 34 obtains values for the identified CI metrics from a a repository (like an operation database) which receives and stores values for such attributes from the network or multi-domain computing environment. Using such values for the identified CI metrics, processor 22, under the direction of module 34, responds to the event to facilitate isolation of the cause or causes of the event by carrying out one or both of steps 108 or 110 described above with respect to system 10.

Figure 6:
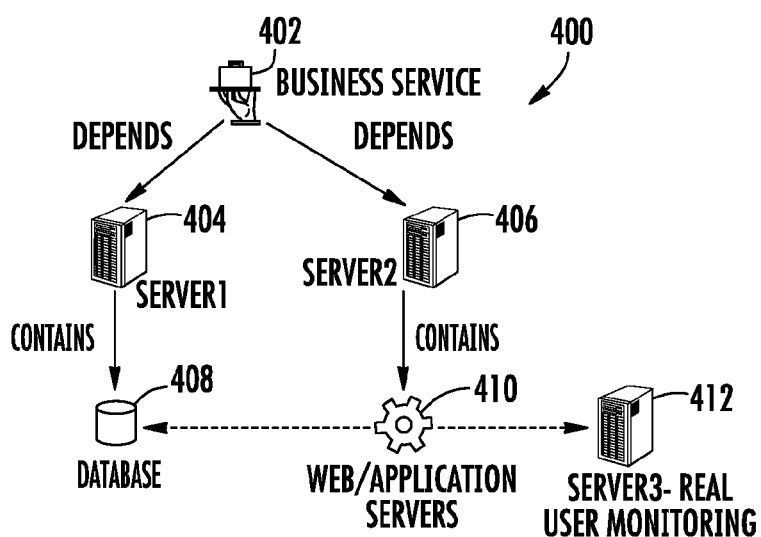
FIG. 6 is a diagram of an example computing environment topology for which the system of FIG. 4 may carry out the method of FIG. 5 to facilitate the isolation of event causation.

FIG. 6 is a diagram illustrating an example topology 400 of a multi-domain computing system as it would be defined in a CMDB. Topology 400 comprises a business service CI 402, a server 1 CI 404, a server 2 CI 406, a database CI 408, a web/application server CI 410 and a server 3 CI 412. Topology 400 may be stored in a configuration management database which has contents describing the metrics which are to be monitored, wherein the runtime values for such metrics are stored in memory 24, such as in an operational database.

In one scenario, an event may be raised on the business service CI 402 when performance does not fall within acceptable limits. In such a situation, the cause or route source for the event or problem may be due to several factors. Following method 300 (shown in FIG. 5), system 210 may assist in isolating the cause for the event or problem. Upon receiving the event, per step 310, system 210 may further identify the event class/type to which the event belongs. For example, the event may belong to an event classification or type E1. One of entries in repository 30 for event type E1 on the business service CI 402 may indicate or identify metrics M1, M2 for server 1 CI 404 and metrics M3, M4 for server 2 CI 406. As a result, following step 316 in FIG. 5, system 210 would acquire the stored runtime values for metrics M1, M2, M3 and M4 for the two servers 404, 406 that are identified as being related to the identified event classification or type E1. Following step 318, system 210 may utilize such values for the metrics M1, M2, M3 and M4 to isolate causation for the event. As noted above with respect to system 10, in one implementation, system 210 may provide a graph (or other visualization) of such metrics to allow a person focus on metrics of interest and to visually isolate the cause for the event. In another implementation, system 210 may automatically analyze and troubleshoot the metrics to isolate event causation and automatically carry out a remedial action or suggest a remedial action for the problem based upon the identified causation.

Figure 7:
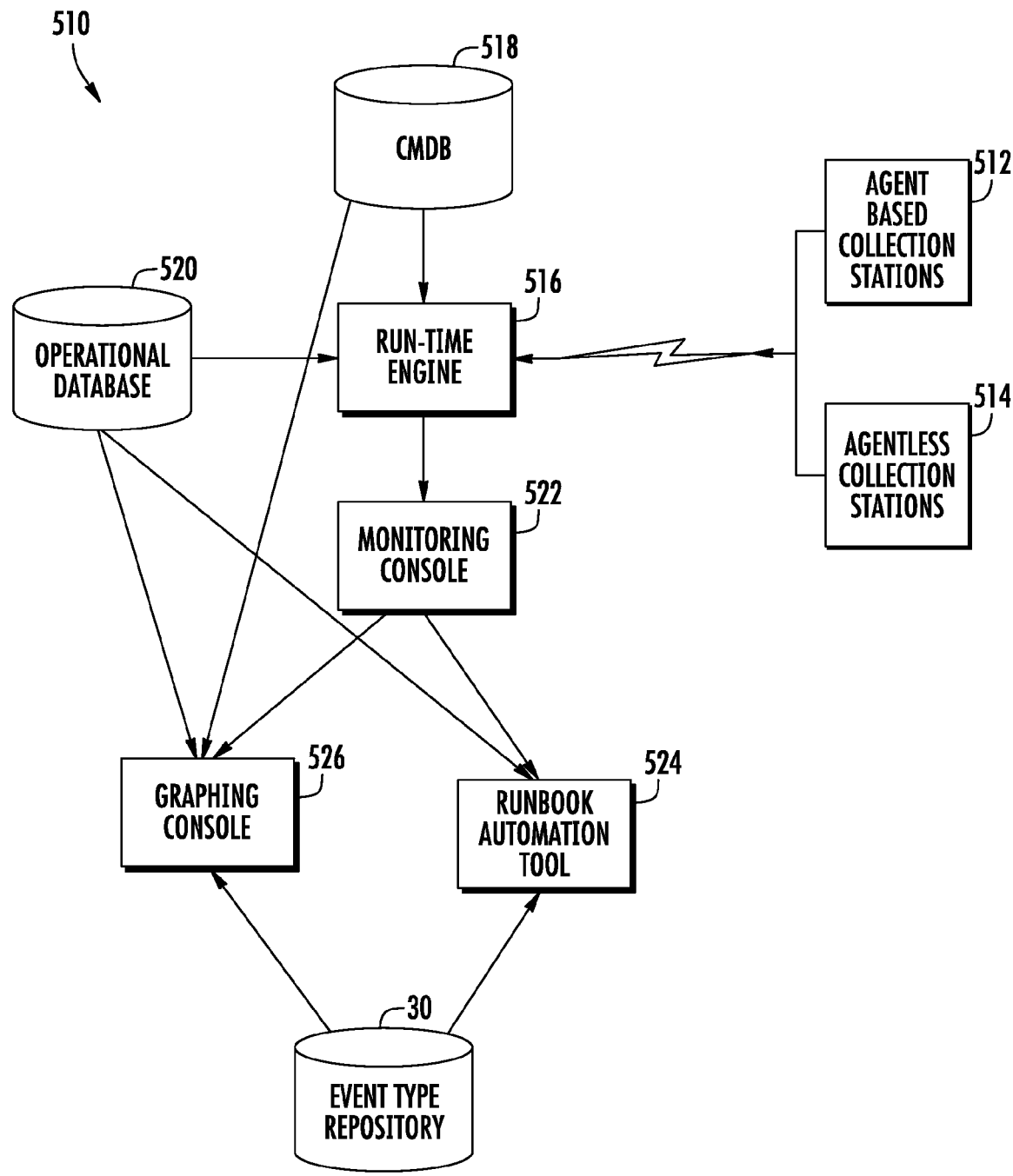
FIG. 7 is a schematic illustration of an example operation or configuration management system.

FIG. 7 schematically illustrates configuration or operation management system 510, an example implementation of system 10. Like system 10, configuration management system 510 facilitates reactive management of information technology (IT) infrastructure using event based operations. In particular, configuration management system 510 utilizes a classification or type designation for an event in a cross-domain computing environment to identify configuration items and or metrics to isolate the one or more causes are causation for the event. As a result, configuration management system 510 better facilitates the identification of root causes for an event such that the problem or event may be better understood and remedied.

Configuration management system 510 comprises agent based collection stations 512, agentless collection stations 514, runtime engine 516, configuration management database (CMDB) 518, operation database 520, monitoring console 522, run book automation tool 524, graphing console 526 and event type repository 30 (described above). Stations 512 and 514 comprise collection stations having rules to monitor CIs in the environment such collection stations transmit monitor events to runtime engine 516.

Runtime engine 516 serves as the backend engine for monitoring console 522 by trapping events received from collection stations 512 and 514. Runtime engine 516 further consults CMDB 518 for the topology (example which is shown in FIG. 6) and correlates events from multiple CIs before passing the result to monitoring console 522. CMDB 518 stores or holds all CIs in the topology and their current settings or configurations. At the same time, operation database 520 stores the values of all runtime metrics for the various CIs.

Monitoring console 522 provides an operations management graphic user interface that displays the events raised by the monitoring agents in collection stations 512, 514. Upon occurrence of an event satisfying a predefined event threshold, monitoring console 522 launches either run book automation tool 524 or graphing counts 526. Graphing console 526 includes a memory acquisition module 32 (described above) and an event response module 34 (described above) for carrying out step 110 in method 100. In particular, graphing console 526 consults repository 30 to identify those metrics from the various CIs that are linked or mapped to an event classification or event type to which the event belongs. After identifying such metrics, graphing console 526 consults operational database 520 to further obtain runtime values for such metrics. Using such values, graphing console 526 graphs the values over a time period related to the event. In one implementation, graphing console 526 may display the topology (received from CMDB 518) and may provide a list of the CIs and associated metrics identified from repository 30 as being of particular interest to the event classification. In such an implementation, the user may select which of the CIs and associated metrics are to be graphed.

Run book automation tool 524 comprises an electronic routine or compilation of procedures or operations to carry out a remedial action in response to an isolated cause of an event or problem. Run book automation tool 524 may include programming for carrying out a step-by-step decision tree to determine an effective course of action to remedy an event. Upon being launched by monitoring console 522, run book automation tool 524 consults repository 30 to identify particular metrics for particular CIs based upon the one or more event types to which the event received for monitoring console 522 belongs. Upon obtaining values for such metrics from operational database 520, run book automation tool 524 carries out analysis of the values for the metrics and carries out one or more automated remedial actions.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompasses a plurality of such particular elements.

What is claimed is:

1. A method comprising:
   receiving signals indicating values for metrics for a plurality of configuration item for computing devices in a cross domain computing environment;
   receiving an identification of an event in a cross domain computing environment, the event comprising a symptom or occurrence of an operational problem of least one of the computing devices in the cross domain computing environment;
   identifying, from a plurality of event classifications, an identification of the classification to which the event belongs;
   obtaining a configuration item of a plurality of configuration items for said at least one of the computing devices based on the identified classification, the configuration item having a setting; and
   acquiring a metric of the obtained configuration item based on the identified classification; and
   identifying a new setting for the configuration item of said at least one of the computing device in the cross domain computing environment based upon the acquired metric.

2. The method of claim 1, wherein the event is associated with a first domain and wherein the obtained configuration item is associated with a second domain.

3. The method of claim 1 further comprising:
   identifying a second configuration item of the plurality of configuration items based on the identified class station; and
   identifying a second metric of the identified second configuration item based on the identified classification to facilitate causation isolation for the event.

4. The method of claim 1 comprising obtaining a second metric of the identified configuration item based on the identified classification to facilitate causation isolation the event.

5. The method of claim 1 further comprising:
   identifying a second classification of the plurality classifications to which the event belongs;
   identifying a second configuration item based on the identified second classification;
   obtaining a metric of the identified second configuration item to facilitate analysis of the event.

6. The method of claim 1 further comprising graphing the identified metric to analyze the event.

7. The method of claim 1 further comprising automatically carrying out a remedial action based upon the identified metric.

8. The method of claim 1, wherein the plurality of event classifications are stored on a non-transient computer-readable medium and comprise at least one of CPU load, a CPU run queue, hard disk drive utilization, file transfer protocol (FTP) service, central processing unit (CPU) usage by structured query language (SQL), SQL query performance, database server status, web server response time, active directory service access status and virtualization service status.

9. The method of claim 1, wherein the plurality of configuration item are stored on a non-transient computer-readable medium and comprise at least one of UNIX system, window system, Oracle database, Microsoft structured query (MS SQL) language database, Internet Information Services (IIS) Web server, Apache Web server, MS-Exchange server, CPU, disk, router, and switches.

10. The method of claim 1 further comprising generating a repository of mapping between the plurality of event classifications, the plurality of configuration items and metrics of the plurality of configuration items, wherein the configuration item and the metric is identified from the repository.

11. An apparatus comprising:
    a non-transient computer-readable medium comprising:
    a metric acquisition module to:
       receive an event classification for an event of a cross-domain computing environment, the event comprising a symptom or occurrence of an operational problem of least one computing device in the cross domain computing environment; and
       to direct a processor to acquire a metric of a configuration item for the at least on computing device from a repository based upon the received event classification; and
    an event response module to direct the processor to respond to the event using the acquired metric.

12. The apparatus of claim 11 further comprising an identification module to direct a processor to identify, from a plurality of event classifications, an identification of the classification to which an event belongs.

13. The apparatus of claim 11, wherein the event response module comprises a graphing module to graph the acquired metric.

14. The apparatus of claim 11, wherein the event response module comprises a resolution module to automatically respond to the event based upon the acquired metric.

15. The apparatus of claim 11 further comprising a non-transient computer-readable medium storing event classifications selected from a group of event classifications consisting of CPU load, a CPU run queue, hard disk drive utilization, file transfer protocol (FTP) service, central processing unit (CPU) usage by structured query language (SQL), SQL query performance, database server status, web server response time, active directory service access status and virtualization service status.

16. The apparatus of claim 11, wherein the event response module is to direct the processor processing unit to respond to the event using the acquired metric by automatically changing configuration item of said at least one computing device in the cross domain computing environment.

17. An apparatus comprising:
   a non-transient computer-readable medium comprising:
   a repository of mapping between a plurality of event classifications, a plurality of configuration items and metrics of the plurality of configuration items; and
   a metric acquisition module to:
      receive an event classification for an event of a cross-domain computing environment, the event comprising a symptom or occurrence of an operational problem of least one computing device in the cross domain computing environment; and
      to direct a processor to acquire a metric of a configuration item for the at least one computing device from the repository based upon the received event classification; and
   an event response module to direct the processor processing unit to respond to the event using the acquired metric.

18. The apparatus of claim 17, wherein the event classifications of the repository comprise event classifications selected from a group of event classifications consisting of CPU load, a CPU run queue, hard disk drive utilization, file transfer protocol (FTP) service, central processing unit (CPU) usage by structured query language (SQL), SQL query performance, database server status, web server response time, active directory service access status and virtualization service status.

19. The apparatus of claim 17, wherein the event response module is to direct the processor processing unit to respond to the event using the acquired metric by automatically changing configuration item of said at least one computing device in the cross domain computing environment.

* * * * *

UNITED STATES PATENT AND TRADEMARK OFFICE
CERTIFICATE OF CORRECTION

PATENT NO. : 9,229,898 B2
APPLICATION NO. : 13/561592
DATED : January 5, 2016
INVENTOR(S) : Krishna Mahadevan Ramakrishnan et al.

Page 1 of 1

It is certified that error appears in the above-identified patent and that said Letters Patent is hereby corrected as shown below:

In the claims,

In column 7, line 54, in Claim 1, delete "item" and insert -- items --, therefor.

In column 7, line 54, in Claim 1, delete "a" and insert -- the --, therefor.

In column 8, line 41, in Claim 9, delete "item" and insert -- items --, therefor.

In column 8, line 61, in Claim 11, delete "on" and insert -- one --, therefor.

Signed and Sealed this
Fourteenth Day of June, 2016

Michelle K. Lee
*Director of the United States Patent and Trademark Office*